United States Patent [19]

Chmelar

[11] Patent Number: 4,757,840
[45] Date of Patent: Jul. 19, 1988

[54] MULTIPIECE SPOOL VALVE
[75] Inventor: Mark A. Chmelar, Dubuque, Iowa
[73] Assignee: Deere & Company, Moline, Ill.
[21] Appl. No.: 78,362
[22] Filed: Jul. 27, 1987
[51] Int. Cl.⁴ .............................................. F15B 13/06
[52] U.S. Cl. ................................ 137/625.69; 137/269; 251/297
[58] Field of Search ........................... 137/269, 625.69; 251/297

[56] References Cited

U.S. PATENT DOCUMENTS

| | | | |
|---|---|---|---|
| 2,826,178 | 3/1958 | Krapf | 137/625.63 |
| 2,928,380 | 3/1960 | Krapf | 137/625.63 |
| 4,254,799 | 3/1981 | Blatt | 137/625.69 |
| 4,286,432 | 9/1981 | Burrows et al. | |
| 4,287,906 | 9/1981 | Green et al. | |
| 4,418,711 | 12/1983 | Stoll et al. | 137/625.69 X |
| 4,576,203 | 3/1986 | Boyer et al. | 137/625.63 |

Primary Examiner—Gerald A. Michalsky

[57] ABSTRACT

A multipiece control spool of a control valve is hooked together by hooks extending from the end surface of each spool member. At least one hook is provided with central plateaus that extend into beveled areas that allow for axial misalignment between hooked spool members. The end surface of one of the spool members is also provided with a central plateau and a recessed surface extending from the plateau, to further aid in allowing for axial misalignment.

16 Claims, 1 Drawing Sheet

MULTIPIECE SPOOL VALVE

BACKGROUND OF THE INVENTION

Field of the Invention:

The invention is directed to a multipiece control spool for a spool valve in which spool members are coupled together by a hook arrangement that allows for limited axial misalignment.

Spool valves are widely used in hydraulic control systems to control the flow of hydraulic fluid. The elongated control spool is positioned inside a valve body having an elongated cavity for accepting the spool. The valve body is provided with ports through which hydraulic fluid can communicate with the elongated cavity. The control spool is provided with control surfaces which control the flow of hydraulic fluid into and out of the cavity. The hydraulic fluid flow pattern is varied by adjusting the axial insertion distance of the spool into the cavity. The spool may also be provided with detents which cooperate with a spring biased ball mounted in the valve body for defining specific axial locations of the spool.

As hydraulic control systems become more sophisticated, the system designer increasingly wants to include more hydraulic control functions in each valve. As the number of hydraulic functions increase, the length of the spool and the valve housing must also increase. However, practically, because of the close tolerances involved, there is an upper limit as to the length of a spool and the length of the housing a manufacturer can properly produce. One way to lengthen spools has been to make multipiece spools that are provided with hooks which couple adjoining spool members together to form a longer control spool. Such a spool configuration is disclosed in U. S. Pat. Nos. 4,418,711 and 4,576,203.

Although longer spools can be fabricated in the manner suggested above, the spool manufacturer must still make the valve body cavity to very close tolerances to accept the extended spool. Typically, to maintain these close tolerances, the valve body cavity is bored from only one end so that the cavity is coaxial throughout. Therefore, the longer the cavity must be bored, the more complicated the machining. As such, it is desirable to bore the valve cavity from both ends to minimize the length of the boring operations. However, such an operation, unless it is very carefully monitored, can result in a non-coaxial cavity. The present invention discloses a control spool having means for providing limited axial misalignment between the spool members and as such provides for larger allowable tolerances in the valve body thereby reducing manufacturing costs.

SUMMARY OF THE INVENTION

The control spool of the present invention comprises at least two spool members that are coupled to one another by a hooking arrangement. One of the hooking members is provided with bevels and plateaus that allow for limited axial misalignment between the spool members. Axial misalignment includes both the center axis of the spool members being offset or displaced and also the center axis of the spool members being non-parallel.

One end of each spool member is provided with a hook having an axially extending portion that is provided with a radially inward extending portion. The radially inward extending portion of at least one spool is provided with an axial outer surface and an axial inner surface, both of which are provided with a central plateau that lies along the central axis of the spool member. Outwardly from the central plateaus, the inner and outer surfaces are beveled to allow for axial misalignment. In addition, the end of the other spool member is provided with another plateau having a recessed area extending therefrom which further provides for axial misalignment.

DETAILED DESCRIPTION

Figure 1:
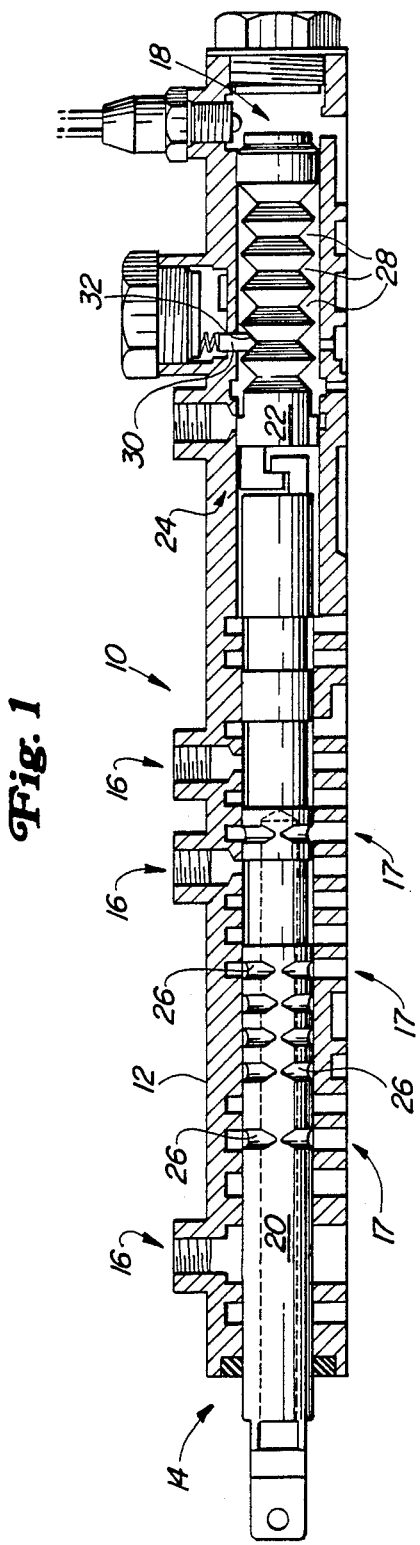
FIG. 1 is a side cross sectional view of a control valve.

FIG. 1 illustrates a hydraulic control valve 10 having a valve body 12 and a control spool 14. The valve body is provided with a plurality of test ports 16 and control ports 17 which communicate with cavity 18 formed in the interior of the valve body. The control spool comprises first spool member 20 and second spool member 22 that are joined together by hook assembly 24. The first spool member 20 is provided with control surfaces 26 and forms a control spool member, whereas second control spool member 22 is provided with detents 28 and forms a detent spool member. The detents of the detent spool member cooperate with spring biased pin 30 having conical surface 32. The detents and the pin defining axial positions of the control spool in the valve body cavity. It should be noted that spool member 22 may also be provided with control surfaces in addition to the detents. Similarly, spool member 20 maybe provided with detents for controlling the axial position of the spool member.

Figure 4:
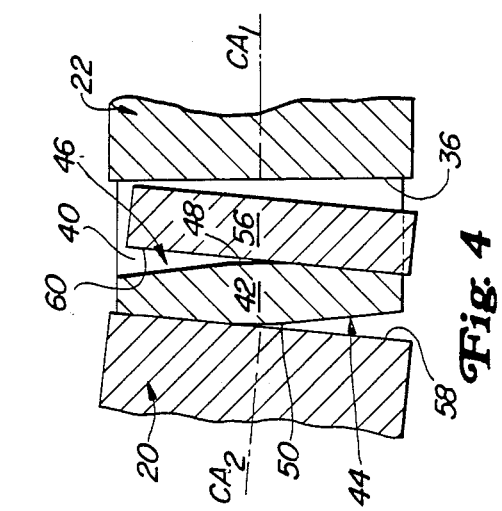
FIG. 4 is a top view of the spool member illustrated in FIG. 3, taken along line 4—4.
Figure 3:
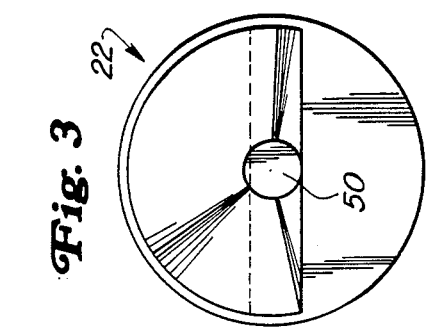
FIG. 3 is an end view of the second spool member.
Figure 2:
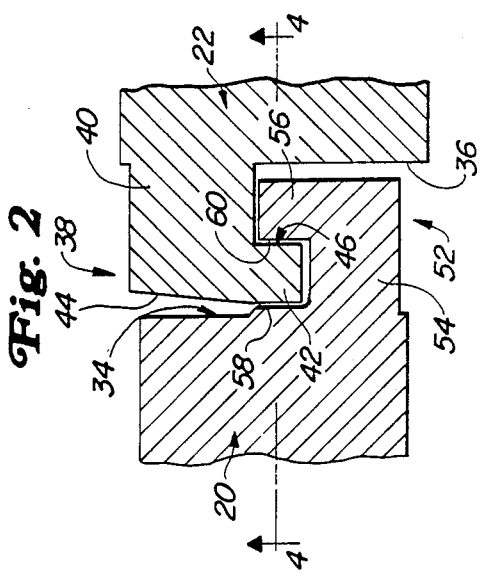
FIG. 2 is a side cross sectional view of the hooking structure of the spool members.

As illustrated in FIG. 2, the first and second spool members are each provided with an end surface 34 and 36, respectively. The second spool member is provided with a second hook 38 that comprises an axially extending portion 40 extending from end surface 36, and a radially inward extending portion 42 that extends from axial portion 40. Radial portion 42 is provided with an axial outer surface 44 and an axial inner surface 46. The axial inner surface 46 is provided with a first axial rectangular plateau 48. The inner surface 46 is beveled away from first plateau 48, as illustrated in FIG. 4. Similarly, axial outer surface 44 is provided with a second circular plateau 50, and surface 44 is beveled away from the second plateau, as illustrated in FIG. 4. Surface 44 having an essentially truncated conical shape.

The first hook member is provided with a first hook 52 having axially extending portion 54 and radially inward extending portion 56. Hook 52 maybe straight milled to simplify the manufacturing process. End surface 34 of spool member 20 is provided with a third central plateau 58 that together with inner surface 60 of radial portion 56 defines a hooking space for receiving radial portion 42 of second hook 38. End surface 34 is recessed away from central plateau 58 to better accommodate axial misalignment. It should be noted that central plateau 58 and inner surface 60 maybe beveled similar to that used in second hook 38, but in the preferred embodiment such additional machining is unnecessary because second hook 38 adequately accounts for the required axial misalignment.

The backlash of the valve is the difference between the axial distance defined by central plateau 58 and inner surface 60, and the axial distance defined by first plateau 48 and second plateau 50. As illustrated in FIG. 4, the total degree of axial misalignment allowed in hooking structure 24 is controlled by the amount of backlash designed into the hooking structure. More specifically, by increasing backlash, the spool members become more free to axially misalign in a non-parallel configuration as illustrated by the divergent central axes CA1 and CA2. The degree of non-parallelism may also be limited by the slope of beveled surfaces 44 and 46. Therefore, as greater axial misalignment is required, backlash must be increased and the beveled surfaces sloped to a greater degree. Therefore, by controlling the backlash, the designer controls the amount of axial misalignment the spool members will accept, however, it should be noted that a certain amount of backlash is required to allow for non-parallel axial misalignment.

The present invention should not be limited to the above-described embodiment, but should be limited solely to the claims that follow.

I claim:

1. A control valve for controlling the flow of fluid between a plurality of conduits, the control valve comprising:

a valve body having an elongated cavity with a substantially longitudinal axis, the cavity is in fluid communication with a plurality of ports located in the valve body;

an elongated control spool extending along the longitudinal axis of the cavity, the control spool is axially movable in the cavity, the spool having a plurality of control surfaces for controlling the flow of fluid into and out of the cavity through the plurality of ports, the control spool comprising a first spool member having a first central axis and a second spool member having a second central axis, each spool member having an end surface which is provided with at least one hook, each hook comprises an axially extending portion that extends outwardly from the lend surface of the spool member and which is provided with a radially inward extending portion, a hooking space is formal between the inward extending portion of each hook and the end surface of each respective spool member the hooks of adjoining spool members are coupled to one another for operatively coupling the spool members together, the radially inward extending portion of at least one hook is provided with an axial outer surface and an axial inner surface, the axial inner surface is beveled outwardly from a first axial plateau surface, and the axial outer surface is beveled inwardly from a second axial plateau surface, the beveled surfaces of the hooks forming a means for allowing for limited axial misalignment of spool members along the longitudinal axis of the elongated cavity.

2. A control valve as defined by claim 1 wherein the first axial plateau is rectangular and the second axial plateau is circular, both plateaus are centered along the central axis of the second spool member.

3. A control valve as defined by claim 2 wherein the end surface of the first spool member is provided with a third axial plateau surface having a center located along the central axis of the first spool member, the third axial plateau surface adjoins the second axial plateau surface of the second spool member when the spool members are hooked together.

4. A control valve as defined by claim 3 wherein the end surface of the first spool member is provided with an inwardly recessed surface that extends from the third axial plateau surface and cooperates with the beveled axial outer surface of the hook of the second one spool member further forming the means for allowing for limited axial misalignment.

5. A control valve as defined by claim 4 wherein the first spool member is a control spool member having control surfaces and the second spool member is a detent spool member and is provided with spool position controlling detents.

6. A spool for a control valve, which is adapted and constructed to be inserted into a valve body having a cavity, and for controlling the fluid flow into and out of a valve body cavity, the spool comprising:

a first elongated spool member having a first central axis and terminating in an end surface that is provided with a first hook, the first hook having an axially extending portion that extends outwardly from the end surface of the spool member and which is provided with a radially inward extending portion, a hooking space is formed between the inwardly extending portion and the end surface;

a second elongated spool member having a second central axis and terminating in an end surface that is provided with a second hook the second hook having an axially extending portion that extends outwardly from the end surface of the spool member and which is provided with a radially inward extending portion, a hooking space is formed between the inwardly extending portion and the end surface; and means for allowing for limited axial misalignment between the first and second spool members when the spool members are joined together by the first and second hooks, the means for allowing for limited axial misalignment comprising the radially inwardly extending portion of the second hook which is provided with an axial outer surface and an axial inner surface, the axial inner surface is beveled outwardly from a first axial plateau surface, and the axial outer surface is beveled inwardly from a first axial plateau surface, the beveled surfaces of the hooks forming the means for allowing limited axial misalignment.

7. A spool as defined by claim 6 wherein the first axial plateau is rectangular and the second axial plateau is circular, both plateaus having centers located along the second central axis of the second spool member.

8. A spool as defined by claim 7 wherein the end of the first spool member is provided with a third axial plateau surface having a center located along the first central axis, the third axial plateau adjoins the second axial plateau surface of the second spool member when the first and second spool members are hooked together.

9. A spool as defined by claim 8 wherein the end surface of the first spool member is provided with an inwardly recessed surface that extends from the third axial plateau surface and cooperates with the beveled axial outer surface of the hook of the second spool member further forming the means for allowing for limited axial misalignment.

10. A spool as defined by claim 9 wherein the first spool member is a control spool member having fluid control surfaces and the second spool member is a detent spool member and is provided with spool position controlling detents.

11. A spool member which is adapted and constructed to be coupled to additional spool members to form a control spool of a control valve, the spool member comprising:

an elongated shaft having a central axis and terminating in an end surface; and a hooking means for coupling the spool member to another spool member, the hooking means comprising an axially extending portion extending from the end surface and a radially inward extending portion projecting from the axially extending portion, the radially inward extending portion and the end surface defining a hooking space, the radially inward extending portion is provided with an axial outer surface and an axial inner surface, the axial inner surface is beveled outwardly from a first axial plateau surface, and the axial outer surface is beveled inwardly from a second axial plateau surface, the beveled surface forming a means for allowing for limited axial misalignment between spool members when they are joined together to form a control spool.

12. A spool member as defined by claim 11 wherein the first axial plateau is rectangular and the second axial plateau is circular, both plateaus having a center located along the central axis of the elongated shaft.

13. A spool member as defined by claim 12 wherein the end surface of the elongated shaft is provided with a third axial plateau surface having a center located along the central axis of the elongated shaft.

14. A spool member as defined by claim 13 wherein the end of the elongated shaft is provided with an inwardly recessed surface that extends from the third axial plateau surface.

15. A spool member as defined by claim 11 wherein the elongated shaft is provided with control surfaces for controlling fluid flow.

16. A spool member as defined by claim 11 wherein the elongated shaft is provided with spool position controlling detents.

* * * * *

UNITED STATES PATENT AND TRADEMARK OFFICE
CERTIFICATE OF CORRECTION

PATENT NO. :    4,757,840
DATED       :   19 July 1988
INVENTOR(S) :   Mark A. Chmeler It is certified that error appears in the above-identified patent and that said Letters Patent is hereby corrected as shown below:

Column 3, line 44, delete "lend" and insert therefor -- end -- . Column 3, line 47, delete "formal" and insert therefor -- formed -- .

Signed and Sealed this

Eleventh Day of July, 1989

Attest:

DONALD J. QUIGG

*Attesting Officer*  *Commissioner of Patents and Trademarks*